US012380048B2

(12) United States Patent
Lee

(10) Patent No.: US 12,380,048 B2
(45) Date of Patent: Aug. 5, 2025

(54) HYBRID SYSTEM FABRIC FOR ENABLING HOST OPERATING SYSTEM AND REAL-TIME OPERATING SYSTEM WITHIN CHIPLET SYSTEM-ON-CHIP

(71) Applicant: Saratoga Milkyway Inc., Saratoga, CA (US)

(72) Inventor: Sheau-Jiung Lee, Saratoga, CA (US)

(73) Assignee: Texas Milkyway Inc., Plano, TX (US)

( * ) Notice: Subject to any disclaimer, the term of this patent is extended or adjusted under 35 U.S.C. 154(b) by 77 days.

(21) Appl. No.: 17/389,155

(22) Filed: Jul. 29, 2021

(65) Prior Publication Data

US 2023/0035610 A1    Feb. 2, 2023

(51) Int. Cl.
*G06F 13/40*    (2006.01)
*G06F 12/0831*    (2016.01)
*G06F 13/16*    (2006.01)
*G06N 3/063*    (2023.01)

(52) U.S. Cl.
CPC ...... *G06F 13/4022* (2013.01); *G06F 12/0831* (2013.01); *G06F 13/1663* (2013.01); *G06N 3/063* (2013.01); *G06F 2213/0038* (2013.01)

(58) Field of Classification Search
CPC ............. G06F 13/1663; G06F 13/4022; G06F 12/0831; G06F 2213/0038; G06N 3/06–063
USPC ..... 382/155–161; 706/15, 22, 34, 41; 710/8, 710/62, 72, 316, 317; 711/141, 146
See application file for complete search history.

(56) References Cited

U.S. PATENT DOCUMENTS

| | | | | |
|---|---|---|---|---|
| 9,262,225 B2 * | 2/2016 | Davis | ..................... | G06F 1/3234 |
| 9,648,102 B1 * | 5/2017 | Davis | ..................... | H04L 67/56 |
| 10,135,731 B2 * | 11/2018 | Davis | ..................... | G06F 1/3234 |
| 10,140,245 B2 * | 11/2018 | Davis | ..................... | G06F 15/167 |
| 10,877,695 B2 * | 12/2020 | Davis | ..................... | G06F 3/067 |
| 11,526,304 B2 * | 12/2022 | Davis | ..................... | G06F 3/067 |
| 11,625,064 B2 * | 4/2023 | Narala | ................. | G06F 1/3206 |
| | | | | 713/400 |
| 11,720,290 B2 * | 8/2023 | Davis | ..................... | G06F 3/0656 |
| | | | | 711/154 |
| 11,733,767 B2 * | 8/2023 | Kakkireni | ............... | H04L 12/10 |
| | | | | 713/320 |
| 12,199,838 B2 * | 1/2025 | Binet | .................. | G06F 11/2007 |
| 2014/0359044 A1 * | 12/2014 | Davis | ..................... | H04L 49/356 |
| | | | | 709/213 |

(Continued)

FOREIGN PATENT DOCUMENTS

| | | | | | |
|---|---|---|---|---|---|
| WO | WO-2023211980 A1 * | 11/2023 | ......... | G06F 12/0815 |
| WO | WO-2023212094 A1 * | 11/2023 | ............ | G06F 11/165 |
| WO | WO-2023212105 A1 * | 11/2023 | .......... | B60W 60/001 |

OTHER PUBLICATIONS

'Extending NoC tech to chiplets' by Schirrmeister and Boillet, Nov. 21, 2023. (Year: 2023).*

(Continued)

*Primary Examiner* — Steven G Snyder
(74) *Attorney, Agent, or Firm* — VEDDER PRICE P.C.

(57) ABSTRACT

A hybrid system fabric is disclosed for use within a chiplet SOC. The hybrid system fabric facilitates fast communication between a real-time system, a host system, chiplets, memory systems, and other shared resources within the chiplet SOC. The hybrid system fabric supports both concurrent high throughput data processing and high computing power.

19 Claims, 7 Drawing Sheets

(56) References Cited

U.S. PATENT DOCUMENTS

| | | | |
|---|---|---|---|
| 2016/0239415 A1* | 8/2016 | Davis | H04L 49/253 |
| 2017/0068639 A1* | 3/2017 | Davis | H04L 49/109 |
| 2018/0293011 A1* | 10/2018 | Schluessler | G06F 1/3225 |
| 2019/0034363 A1* | 1/2019 | Palermo | G06F 13/4022 |
| 2020/0159449 A1* | 5/2020 | Davis | G06F 3/0604 |
| 2020/0186715 A1* | 6/2020 | Keal | H04N 23/6812 |
| 2021/0117130 A1* | 4/2021 | Davis | G06F 3/061 |
| 2021/0279334 A1* | 9/2021 | Kim | G06F 12/1441 |
| 2022/0413593 A1* | 12/2022 | Kakkireni | G06F 1/3215 |
| 2022/0413804 A1* | 12/2022 | Vanesko | G06F 9/3887 |
| 2023/0046542 A1* | 2/2023 | Narala | G06F 1/324 |
| 2023/0131039 A1* | 4/2023 | Davis | G06F 3/0656 |
| | | | 711/154 |
| 2023/0339499 A1* | 10/2023 | Binet | G06N 3/0442 |
| 2023/0342161 A1* | 10/2023 | Binet | G06F 9/4405 |
| 2024/0012581 A1* | 1/2024 | Davis | H04L 49/351 |
| 2024/0089181 A1* | 3/2024 | Binet | G06F 11/202 |
| 2024/0220426 A1* | 7/2024 | Reddy | H04N 19/44 |
| 2024/0311330 A1* | 9/2024 | Das Sharma | G06F 13/4295 |

OTHER PUBLICATIONS

'Network-on-Chip (NoC) Technology' by Arteris, 2025. (Year: 2025).*

* cited by examiner

FIGURE 3

Memory Space
300

| Base | Top | | | |
|---|---|---|---|---|
| Physical address memory map with 40 bit physical address | | | | |
| xxxx_xxF0_0000_0000 (1111_1111_0000_0000_....) | xxxx_xxFF_FFFF_FFFF | non-Cacheable flash ROM, booting ROM, non-volatile NPU coefficient fast wake up | 32-256 MB space | Channel 0 |
| xxxx_xxE0_0000_0000 (1110_0000_0000_0000_....) | xxxx_xxEF_FFFF_FFFF | Unused | | |
| xxxx_xxD0_0000_0000 (1101_0000_0000_0000_....) | xxxx_xxDF_FFFF_FFFF | memory map I/O, System control | 256 MB space | |
| xxxx_xxA0_0000_0000 (1010_0000_0000_0000_....) | xxxx_xxCF_FFFF_FFFF | non-cacheable Co-processor/Hardware accelerator private memory, e.g. private memory | 128 GB space | Channel 2,3 |
| xxxx_xx80_0000_0000 (1000_0000_0000_0000_....) | xxxx_xx9F_FFFF_FFFF | non-cacheable Display/NPU/GPU memory, CPU/GPU/Display controller | 128 GB space | Channel 4,5 |
| xxxx_xx40_0000_0000 (0100_0000_0000_0000_....) | xxxx_xx7F_FFFF_FFFF | non-cacheable Exchange high speed SRAM, between CPU and co-processor/hardware accelerator | 64 GB space | Channel 1 |
| xxxx_xx10_0000_0000 (0001_0000_0000_0000_....) | xxxx_xx3F_FFFF_FFFF | non-cacheable buffer memory, e.g. system memory/peripheral/npu coefficient weight. | 64 GB space | Channel 6,7 |
| xxxx_xx00_0000_0000 (0000_0000_0000_0000_....) | xxxx_xx0F_FFFF_FFFF | Cacheable system memory to OS | 512 GB space | Channel 8-N |

Flash ROM should decode the address [39:36]=[1111]

Memory map I/O control should decode the address [39:36]=[1101]

Non-cacheable private memory should decode the address [39:36]=[1100]

Non-cacheable Display/GPU memory should decode the address [39:36]=[1010]

Non-cacheable exchange high speed SRAM should decode the address [39:36]=[1001]

Non-cacheable buffer memory should decode the address [39:36]=[1000]

Cacheable memory should decode the address [39]=[0]

HYBRID SYSTEM FABRIC FOR ENABLING HOST OPERATING SYSTEM AND REAL-TIME OPERATING SYSTEM WITHIN CHIPLET SYSTEM-ON-CHIP

FIELD OF THE INVENTION

Numerous embodiments are disclosed of a hybrid system fabric that enables a host operating system and a real-time operating system to be executed within a chiplet system-on-chip (SOC).

BACKGROUND OF THE INVENTION

Chiplet SOCs are the latest evolution of design technique in a post-Moore's Law world. A chiplet SOC comprises a plurality of chiplets within a single packaged device (i.e., a chip). Each chiplet comprises a functional circuit block, typically fabricated on its own die, that has been specifically designed to work with other chiplets to perform more complex functions.

By operating within a chiplet SOC, a general-purpose CPU can deliver enhanced performance in conjunction with chiplets that a monolithic CPU without chiplets cannot match. A general-purpose CPU focuses on improving data processing throughput and neglects the urgency of real-time tasks. Therefore, prior art chiplet SOCs often adopt a unified cache coherent system fabric and leave hardware blocks to compete for system resources. As a result, the system fabric of prior art devices is only able to maintain the data coherency of the system at the penalty of a longer task execution latency, since tasks are all competing for common resources.

In the case of graphic processors or tensor processors, the systems typically integrate dedicated memory blocks such as HBM (high bandwidth memory) into the chiplet so that these processors act like independent subsystems. This kind of an independent SOC chiplet communicates to the host system through PCIe or a proprietary serial link and acts as a co-processor or hardware accelerator for the host through multilayer packet protocols. This is useful for a high throughput but latency-insensitive application like machine learning, but is unable to support real-time applications for fast responsive tasks due to the long latency of communication through those peripheral buses and multi-layer packet protocols.

Many emerging applications require not only high throughput data processing but also short latency communication with co-processor/hardware accelerators. For example, chiplet SOCs have become prevalent in artificial intelligence (AI) applications where high computing power is required for machine learning.

Prior art chiplet SOCs often implement a hardware network bus inside the SOC to facilitate communication of real-time tasks with the host system. However, even with an on-chip network bus, the network protocol prevents the further improvement of fast communication due to the overhead associated with network protocols.

What is needed is an improved chiplet SOC architecture that overcomes the shortcomings of prior art solutions.

SUMMARY OF THE INVENTION

A hybrid system fabric is disclosed for use within a chiplet SOC instead of an on-chip network bus or a general-purpose coherent system fabric. The hybrid system fabric facilitates fast communication between a real-time system, a host system, chiplets, and system resources within the chiplet SOC. The hybrid system fabric supports both concurrent high throughput data processing and high computing power.

BRIEF DESCRIPTION OF THE DRAWINGS

FIG. 3 depicts an embodiment of a memory space for a chiplet SOC.

DETAILED DESCRIPTION OF THE INVENTION

Figure 1:
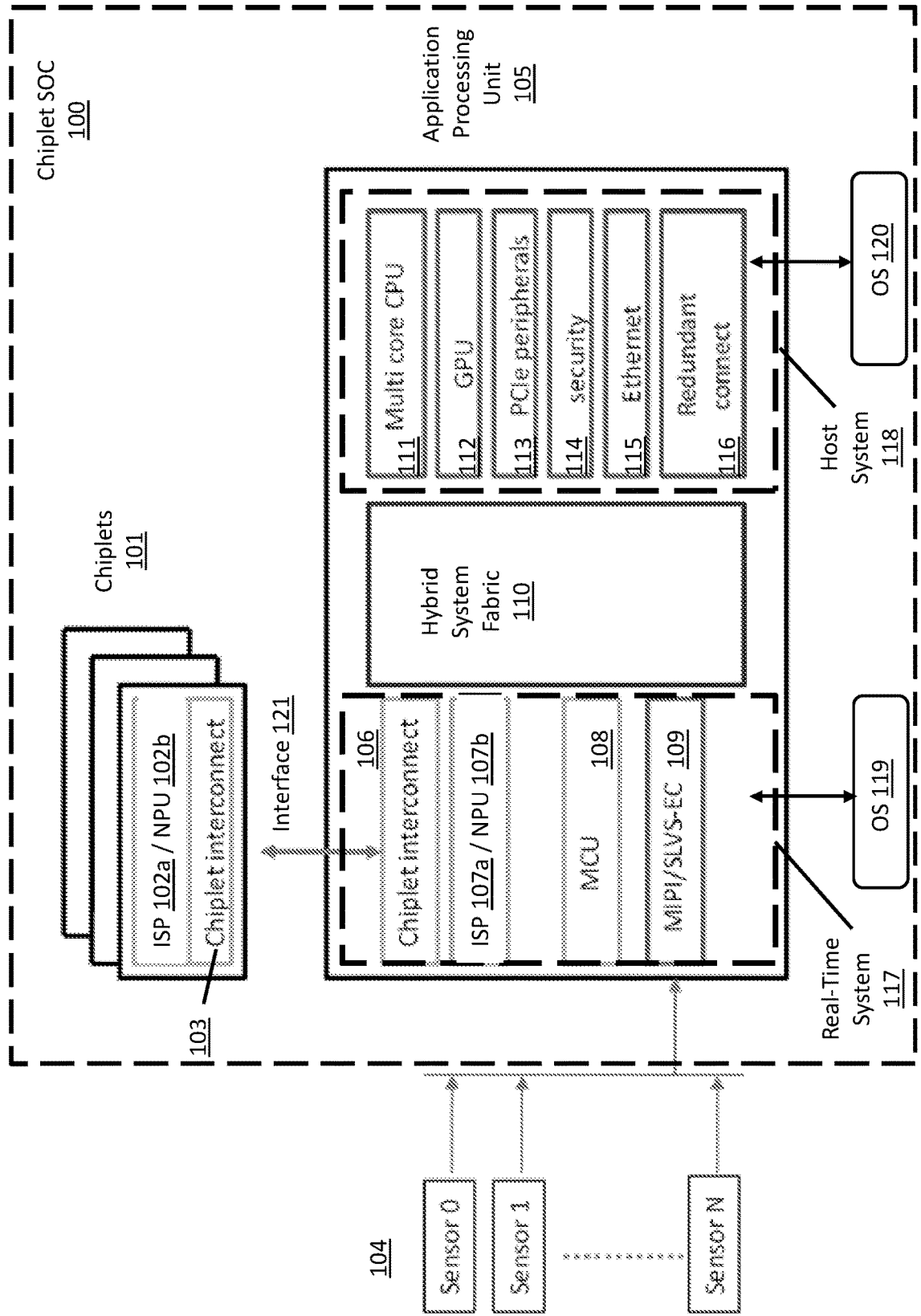
FIG. 1 depicts an embodiment of a chiplet SOC.

FIG. 1 depicts chiplet SOC 100. Chiplet SOC 100 comprises application processing unit (APU) 105 coupled to one or more chiplets 101. Chiplet SOC 100 optionally is coupled to one or more sensors 104. Sensors 104 can comprise, for example, image sensors for capturing image data from the outside environment. In this example, each chiplet 101 comprises image sensor processor (ISP) 102a, neural processing unit (NPU) 102b, and/or other circuitry for performing special purpose functions. APU 105 comprises real-time system 117 coupled to host system 118 through hybrid system fabric 110.

Host system 118 is controlled by host operating system 120. Host system 118 comprises blocks that are typically contained in an application processing unit, such as multi-core CPU 111; graphics processing unit (GPU) 112; PCIe peripheral bus 113 for NVMe, Wifi, USB etc.; security monitor 114; Ethernet controller 115; and interconnect 116 for a mirroring unit to support redundancy. Host operating system 118 optionally can implement one or more virtual machines and allocate hardware resources to each virtual machine.

Real-time system 117 is controlled by real-time operating system 119. Real-time system 117 in this example comprises microcontroller unit (MCU) 108; external device connections 109, such as MIPI or SLVS-EC for sensors 104; on-chip image signal processor 107a and/or on-chip neural processor 107b; and chiplet interconnects 106 to external chiplets 101. Chiplet interconnect 103 and chiplet interconnect 106 communicate over interface 121.

The pipeline of the data path from sensors 104 to image signal processor 107a and neural processing unit 107b is controlled by MCU 108. MCU 108 will allocate resources to each sensor 104 for real-time task execution. The final processed data is fed to the applications for executing in time under the host operating system 120.

All system resources allocated by host system 118 or real-time system 117 are routed through the hybrid system fabric 110, which acts as a unified system allocator. As a result, hybrid system fabric 110 must support host system 118 and real-time system 117 through hardwire routing in a timely fashion with low latency. Similarly, chiplets 101 are connected to the hybrid system fabric 110 to perform real-time tasks and deliver the final result to host system 118.

Figure 2:
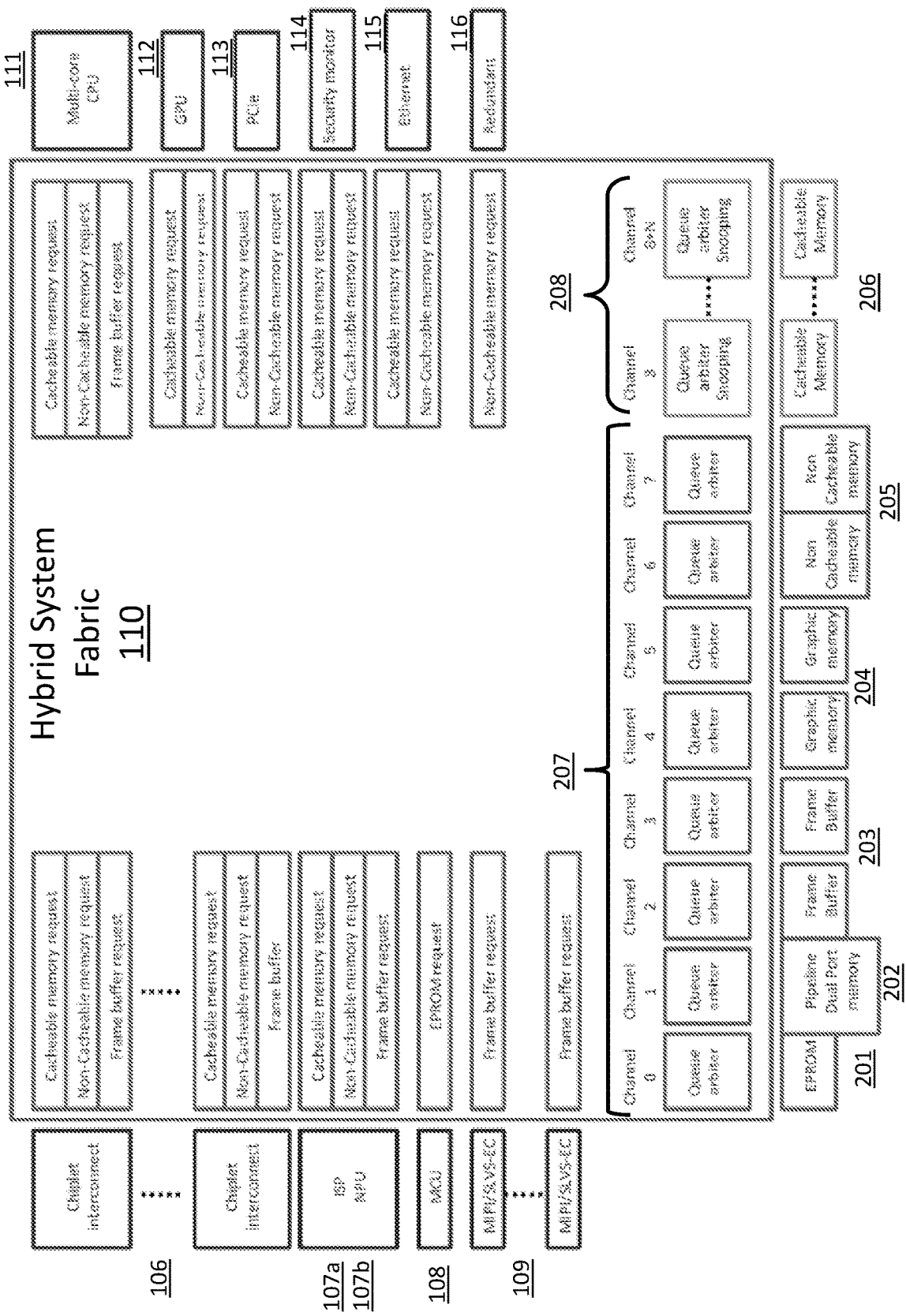
FIG. 2 depicts an embodiment of a hybrid system fabric for a chiplet SOC.

FIG. 2 depicts additional detail regarding an embodiment of hybrid system fabric 110. Hybrid system fabric 110 enables the use of various types of memories for the various types of task execution that are performed by host system 118 and real-time system 117. By contrast, a prior art chiplet SOC typically enables the use of only one type of memory for use by host system 118.

Hybrid system fabric 110 enables each master to access a common system resource, namely, the memory of the system. In this example, each block in real-time system 117 and host system 118 that requires access to a memory resource can act as a master, such as multi-core CPU 111, GPU 112, PCIe peripheral bus 113, security monitor 114, Ethernet controller 115, and interconnect 116 in host system 118 and MCU 108, external device connections 109, on-chip image signal processor 107a, on-chip neural processor 107b, and chiplet interconnects 106 in real-time system 117.

For hybrid system fabric 110 to work, all masters must use a predefined physical memory address to access the target memory. Using the physical memory address, hybrid system fabric 110 can route the desired request for each task generated by a master to the correct target memory channel.

In the example of FIG. 2, hybrid system fabric 110 supports 8+N memory channels. Notably, channel 8 through channel 8+N are all linked to the cacheable system memory 206, which is executed by host system 118 and blocked from real-time system 117. In order to maintain data coherency, each cacheable memory channel (that is, channels 8 through 8+N) implements a hardware snooping circuit 208 to snoop the local cache of multi-core CPU 111 in host system 118. In this particular implementation, hybrid system fabric 110 supports a snooping port dedicated to each cacheable memory channel. By contrast, a prior art system fabric typically comprises only a single snooping port. The purpose of the multi-snooping port is to improve the concurrency of the cacheable memory channel execution.

The multi-snooping port 208 of hybrid system fabric 110 can allow different masters to access a cacheable memory channel without needing arbitration to gain the right to snoop multi-core CPU 111. Such arbitration would actually create more memory collisions during the cacheable memory access and consequently increase the memory access latency and reduce the effective memory bandwidth.

In this example, channels 0 through channel 7 are not cacheable memory channels and are used to access memory devices whose contents are not cached. Here, channels 0 through 7 access EPROM 201, pipeline dual port memory 202, frame buffer 203, graphic memory 204, and other non-cacheable memory 205 as indicated in FIG. 2.

FIG. 3 depicts an embodiment of a memory space 300 supported by hybrid system fabric 110. In this example, memory space 300 is defined by 40-bit physical memory addresses. A person of ordinary skill in the art will appreciate that physical memory addresses of more than 40 bits or less than 40 bits may be used instead. Each address can be accessed by a master in host system 118 or real-time system 117. The 8+N memory channels are defined within memory space 300 as follows:

Channel 0: The memory type accessed by this channel is non-volatile memory, such as EPROM 201, where data will be retained even if the power is off. The physical address maps range from FF_F000_0000 to FF_FFFF_FFFF. 256M byte address is dedicated to EPROM 201. EPROM 201 can be, for example, an SPI EPROM to store the host system boot up code and the real-time system boot up code. It also can store weight coefficients for NPU 107b. NPU 107b can fetch its weight coefficients from EPROM 201 during boot up and store to its local memory. This memory channel allows the multi-core CPU 111, MCU 108, and NPU 107b to access its stored data through channel 0 during boot up.

Channel 1: The memory type accessed by this channel is pipeline dual port memory 202, such as a high speed dual port SRAM. It can be implemented by a fast speed pipeline dual port memory (such as the memory disclosed in U.S. Pat. No. 5,206,833, which is incorporated by reference herein) to save on die size. The physical address map ranges from 90_0000_0000 to 9F_FFFF_FFFF. The motivation for dual port memory is to support the fast communication between host system 118 and real-time system 117. The content of this channel memory should not be cacheable by multi-core CPU 111. This is to avoid any problem due to data coherency. The data can be written to this fast memory by either on the chip NPU 107b or the chiplet NPU 102b during its real-time execution, and the multi-core CPU 111 can read the real-time data from this fast memory to perform application execution by host system 118. The dual port memory in channel 1 serves as a fast link between host system 118 and real-time system 117. For example, one way to transfer data between host system 118 and real-time system 117 is for the sender to store data in dual port memory 202 over channel 1, and for the receiver to then read the data in dual port memory 202 over channel 1. This avoids any network type of communication between host system 118 and real-time system 117. Consequently, the low latency communication can be achieved by using a fast dual port memory in channel 1 managed by hybrid system fabric 110.

Channel 2, 3: The memory type accessed by this channel is a high speed DRAM, such as frame buffers 203. The physical address maps range from C0_0000_0000 to DF_FFFF_FFFF. In this implementation, these two channels are accessible to real-time system 117 and are not visible to or accessible by host system 118. In the example of FIG. 2, the frame buffers are frame buffers for storing image data captured by image sensors 104. The memory architecture adopts a ping-pong operation to support multiple high frame rates of image sensors 104. For example, while one channel is used to store and buffer the incoming frame memory from multiple image sensors 104, the other channel can be used to supply the raw image data to image signal processing unit 107a and neural processing unit 107b. This can avoid the problem of the collision between storing data and reading out data and the data bandwidth can be efficiently consumed without read-write contentions. It also facilitates synchronization between the multiple sensors 104 and the image signal processor 107a.

Channel 4, 5: The memory type accessed by this channel is a high speed DRAM, such as graphic memory 204. The physical address maps range from A0_0000_0000 to BF_FFFF_FFFF. In the example of FIG. 2, these two memory channels are used for graphic memory 204. In order to achieve a high performance system, graphic memory 204 is physically separated from the multi-core CPU 111 memory bus (such as channels 8 through 8+N). Image signal processor 107a writes the post-processing image memory to channel 4 or 5 after it processes the raw image data from image sensors 104. GPU 112 will access graphic memory 204 for further tasks and display to the display devices. Host system 118 also assigns these memory channels as non-cacheable to CPU 111. In other words, any data coherency problem is avoided because graphic memory 204 content is updated in a real-time fashion by image signal processor 107a and does not cache any data. Thus, channels 4 and 5 are accessible to both real-time system 117 and host system 118. It is also arranged as a ping-pong operation to avoid channel request collision.

Channel 6, 7: The memory type accessed by this channel is a high speed DRAM, such as non-cacheable memory 205. The physical address maps range from 80_0000_0000 to 8F_FFFF_FFFF. In the example of FIG. 2, these two memory channels are used for non-cacheable memory 205 accessible to host system 118. Real-time system 117 is not able to see these two memory channels. In host system 118, these two memory channels are primarily used for peripheral devices or hardware accelerators in host system 118. These devices perform the concurrent task execution and avoid the memory resource competition with multi-core CPU 111. Some examples are to support a DSP or a video CODEC for peripheral devices.

Channel 8 to 8+N: The memory type accessed by these channels are high speed DRAM, such as cacheable memory 206. The physical address maps range from 00_0000_0000 to 7F_FFFF_FFFF. These memory channels are used to access the cacheable system main memory 206 for host system 118. It is mainly used for system task execution by multi-core CPU 111. Multi-core CPU 111 also implements a cache memory system for performance. Therefore, the system needs to maintain data coherency between memory channels and the cache memory of multi-core CPU 111. Hardware snooping for data coherency is more efficient than using software to flush the cache of multi-core CPU 111. It also requires the memory channel to implement snooping circuits to snoop the cache of multi-core CPU 111.

In prior art devices, all memory channels share only one snooping port to snoop the shared cache in multi-core CPU 111. Therefore, in such prior art devices, all cacheable memory transactions are required to arbitrate to gain ownership of the snooping port even if the system has multiple memory channels. After snooping, all memory channels are open for access. This defeats the benefit stemming from the concurrency of multiple cacheable memory channels.

By contrast, hybrid system fabric 110 supports a multiple memory snooping port 208 for multiple memory channels (such as channels 8 through 8+N). Each cacheable memory channel will have its own snooping port 208 to the cache system of multi-core CPU 111, and multi-core CPU 111 will support multiple snooping ports in each cache memory system to improve the effective system bandwidth and reduce the memory latency without extra snooping overhead.

Figure 4:
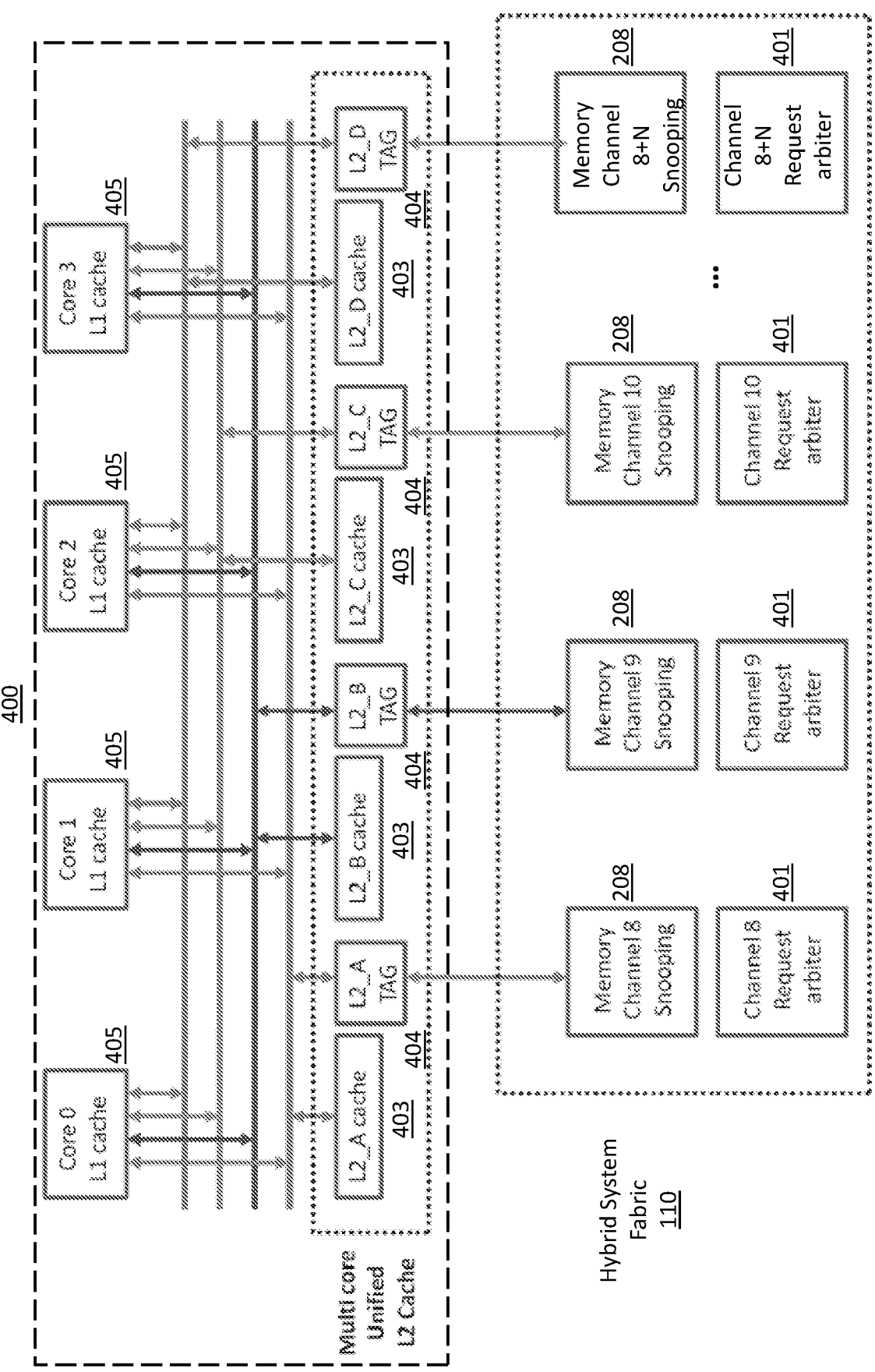
FIG. 4 depicts an embodiment of a cache system for a chiplet SOC.

FIG. 4 depicts an embodiment of a cache system within multi-core CPU 111. Hybrid system fabric 110 interacts with the cache system using multiple snooping port interfaces 208. Each snooping port interface 208 interacts with an arbiter 401 for that memory channel. Cache system 400 comprises L2 cache memory 403 and an L2 cache TAG buffer 404 that is the target of snooping port interfaces 208. For example, snooping port interface 208 can check if a memory address that is the subject of a read operation is indicated in TAG buffer 404 as being stored in the L2 cache memory 403 or in the L1 cache memory 405.

In the example of FIG. 4, if N=3, then hybrid system fabric 110 will comprise a quad memory channel (channels 8, 9, 10, and 11) to serve the task execution in the cacheable memory space. Hybrid system fabric 110 is connected to a quad core CPU (an example of multi-core CPU 111) with a unified 4-way set associative L2 cache 403. There are 4 TAG RAM 404 for 4-way set associative cache. Each memory channel will be linked to a specific way set associative of L2 cache 403 through one of four snooping ports 208. This replaces a single snooping port used in the prior art and reduces channel competition among all memory masters. This design reduces the latency of cache snooping for data coherency but also increases the effective memory bandwidth of the system.

Figure 5:
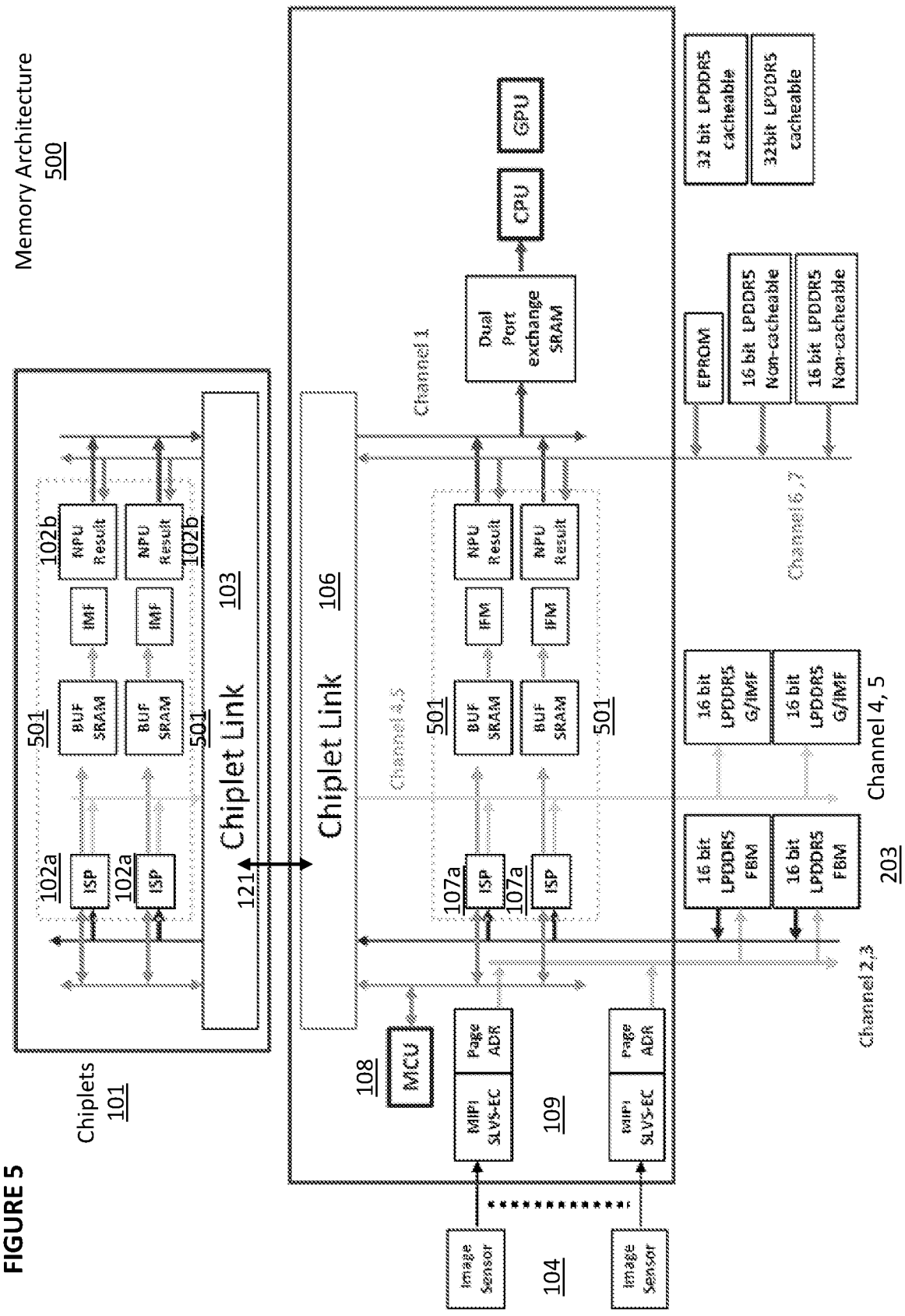
FIG. 5 depicts an embodiment of a memory architecture for a chiplet SOC.

FIG. 5 depicts memory architecture 500 for chiplet SOC 100 as utilized by chiplet 101. The whole system is made of two separated systems each executing its own task concurrently. Since hybrid system fabric 110 can partition the system into cacheable and non-cacheable memory channels, the non-cacheable memory channels may be assigned to any desired application. It is flexible to optimize the memory channel for any specific application without degrading the host system performance. Hybrid system fabric 110 uses a predefined physical memory address map, such as memory space 300 in FIG. 3, to all co-existing systems to operate in its own private memory space. The result of the hybrid system fabric provides a seamless separation of the different co-existing systems and improves the latency between all systems. All hardware accelerators and coprocessors can also access the memory at lower latencies by reducing the frequency of memory request collisions.

Hybrid system fabric 110 supports a scalable chiplet SOC platform for communication between a demanding real-time task execution and a host system task execution. The real-time task execution is controlled by MCU 108. MCU 108 will direct the raw data from image sensors 104 passing through MIPI interface circuit 109 to channel 2 or 3 depending on the status of image signal processor 107a. Assuming image signal processor 107a or 102a is reading raw data from channel 2, MCU 108 will direct the raw data from each MIPI interface 109 to channel 3. Channel 2 and 3 are named as the FBM (frame buffer memory) 203 which is not visible to the host system and it is only accessible to real-time system 117.

MCU 108 programs the base address of MPI interface 109 to a pre-defined address dedicated to each image sensor 104 depending on its task priority, its resolution and its frame rate. Therefore, under the control of MCU 108, the inputs of all data from image sensors 104 will not be stalled as there is no need to arbitrate with image signal processor fetching.

MCU 108 will regulate the ping pong channel access (between channels 2 and 3 in this example) for raw data input from multiple image sensors 104 and raw data fetching to multiple image signal processors 107a or 102a. These memory channels are executed through the hybrid system fabric 110 based on the physical address associated with each hardware unit.

After image signal processing, the ISP (image signal processor) 107a will pass the post-processed image to an SRAM buffer 501 that is connected to the input featured map of a neural processing unit 107b, and the graphic memory 204 over channels 4 and 5. Once the processed image is passed to the memory channel 4 and 5, the host system 118 can see the image through channel 4 and 5. Since those channels are non-cacheable to CPU 111, data coherency is not a problem. The GPU 112 can further process these graphics contents by a frame rate conversion, scale to the target display resolution, or overlay on a GPS road map. Host system 118 can perform any desired graphics task without any hardware snooping CPU 111 to avoid any performance degradation.

After image signal processing, the processed data also passes through an SRAM buffer 501 as the input feature map to the neural processing unit 107b or 102b. The need for SRAM buffer 501 is due to the synchronization between ISP and NPU execution speed. The NPU 107b or 102b will fetch the weight coefficient from the memory channel 0 through the hybrid system fabric 110 and store it to the local SRAM. Once NPU 107b or 102b receives the IFM of a frame, NPU 107b or 102b will start to detect the object in the image through neural network processing. On completing the processing, the NPU 107b or 102b will produce the output feature map and write to the high speed dual port memory at memory channel 1, and at the same time assert an interrupt request to CPU 111 so that CPU 111 will know there is an object detection result in the memory channel 1. Memory channel 1 is also non-cacheable to CPU 111. Any write to this memory channel by NPU 107b or 102b will not cause any inconsistent data to CPU 111. This is how hybrid system fabric 110 supports the concurrent execution between real-time system 117 and host system 118.

FIG. 5 also shows how the external chiplet 101 is connected to hybrid system. Interface 121 coupled chiplet link 103 and chiplet link 106. In one embodiment, interface 121 is a parallel bus that emulates all needs of bus connection to hybrid system fabric 110. One should avoid a traditional serial bus, such as PCIe or CXL, to use for chiplet link 103/106. This is because such serial bus, PCIe or CXL, can cause a long latency defeating the purpose of a real-time response. But a parallel bus will limit the number of connected chiplet due to the large number of pin interconnects. Thus, one preferred candidate for interface 121 is a serial bus with embedded side band communication, such as the interface disclosed in U.S. Pat. No. 10,614,027, which is incorporated by reference herein.

The above description of hybrid system fabric 110 consists of different memory channels with different memory types. The hybrid system implements dedicated snooping ports to avoid the cacheable memory congestion of the host system memory. The hybrid system fabric also implements many dedicated non-cacheable memory channels. These dedicated non-cacheable memory channels can individually serve as the private local memory to a coprocessor/hardware accelerator. Hybrid system fabric 110 can avoid the memory corruption between two different co-existing systems, namely host system 118 and real-time system 117. It can support the scaling of the system performance by connecting more chiplet co-processing units 101 without causing cacheable memory congestion in the host system.

Figure 6:
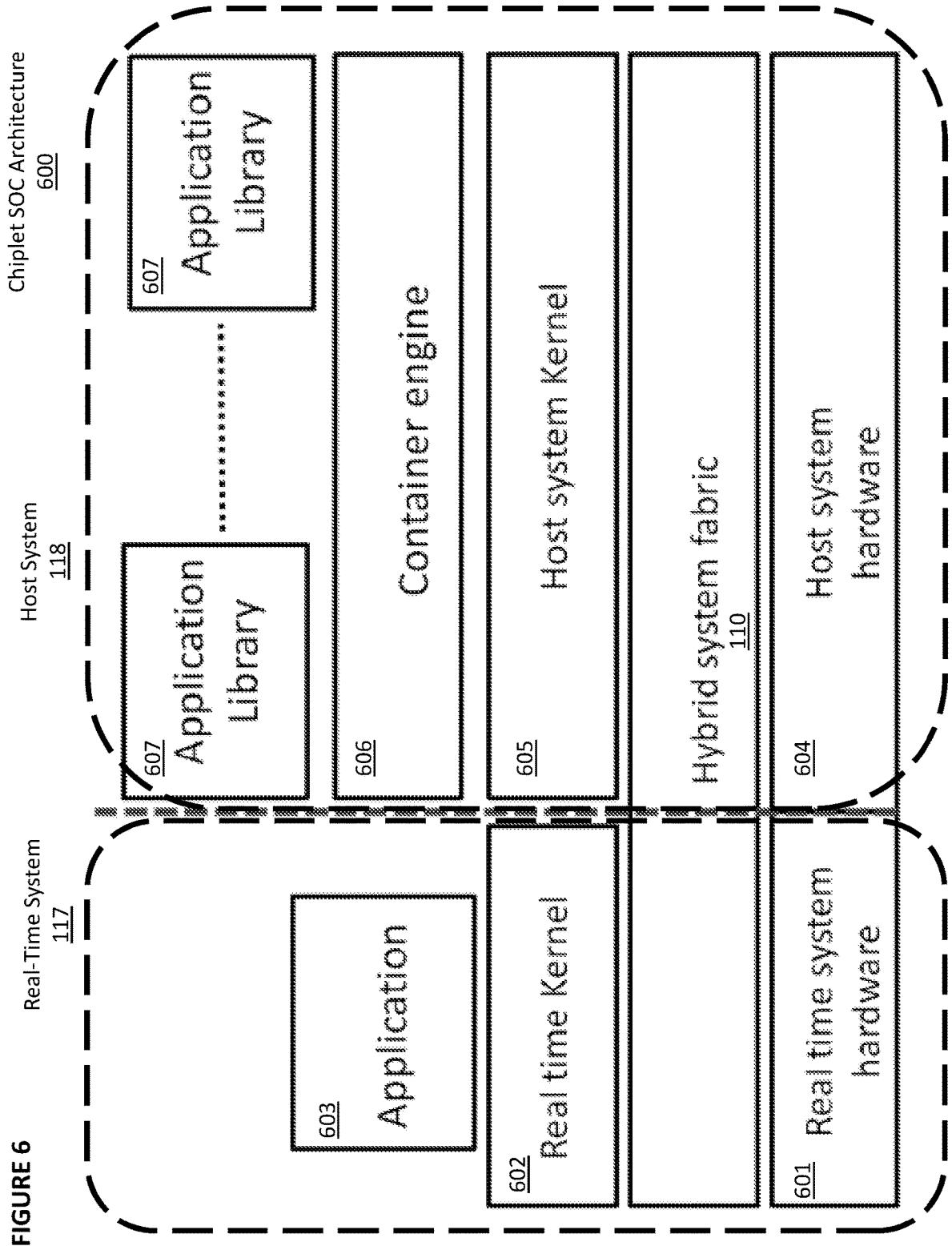
FIG. 6 depicts an embodiment of an architecture of a chiplet SOC.

FIG. 6 depicts a hardware and software architecture 600 of chiplet SOC 100.

Real-time system 117 comprises real-time system hardware 601, such as the components described above with reference to FIG. 1; hybrid system fabric 110; real-time kernel 602, which can be part of real-time operating system 119; and application 603.

Host system 118 comprises host system hardware 604, such as the components described above with reference to FIG. 1; hybrid system fabric 110; host system kernel 605, which can be part of host operating system 120; container engine 606; and application library 607, which can comprises a plurality of applications.

In summary, chiplet SOC 100 comprises the following characteristics and functionality:

(1) A hybrid system fabric consists of many memory request ports with the same interface to the master either on-chip masters or external chiplet masters. A hybrid system fabric contains multiple memory channels that can simultaneously support a host system and a guest system such as a real-time system without the problem of data corruption.

(2) A hybrid system fabric assigns the memory channel to serve two classes of memory, namely the cacheable memory and non-cacheable memory.

(3) A hybrid system fabric assigns the non-cacheable memory into three different kinds. One is a private memory channel to the real-time, another is a private memory channel to the host system, and the last is a shared memory channel between the real-time system and the host system.

(4) A hybrid system fabric assigns a memory channel that uses a high speed dual port SRAM for a fast communication between the host system and the real-time system. The real-time system will update the real-time result and the host system will fetch the real-time result with minimal latency.

(5) A hybrid system fabric can assign a ping pong buffer to serve large numbers of high frame rate raw data input and avoid memory collisions between reading and writing the raw data.

(6) A hybrid system fabric assigns separated non-cacheable memory channels for the graphic processing without using shared memory and thereby avoids performance degradation due to memory collisions.

(7) A hybrid system fabric implements multiple hardware snooping ports to multiple cacheable memory channels to avoid the memory requests collision due to a single snooping port.

(8) External chiplet will interface the same way as other masters to the hybrid system fabric after passing through the chiplet link.

(9) The separation between the host system and the real-time system is defined by the physical memory address mapping.

(10) The memory physical address translation is done by CPU in the host system and done by MCU in the real-time system.

(11) The hybrid system fabric provides hardware isolation to each channel. The software programmer can see the whole system as a unified system encapsulating two coexisting systems (the host system and the real-time system).

The embodiments described herein overcome the shortcomings of the prior art and can provide concurrent high throughput data processing and high computing power in numerous applications.

Figure 7:
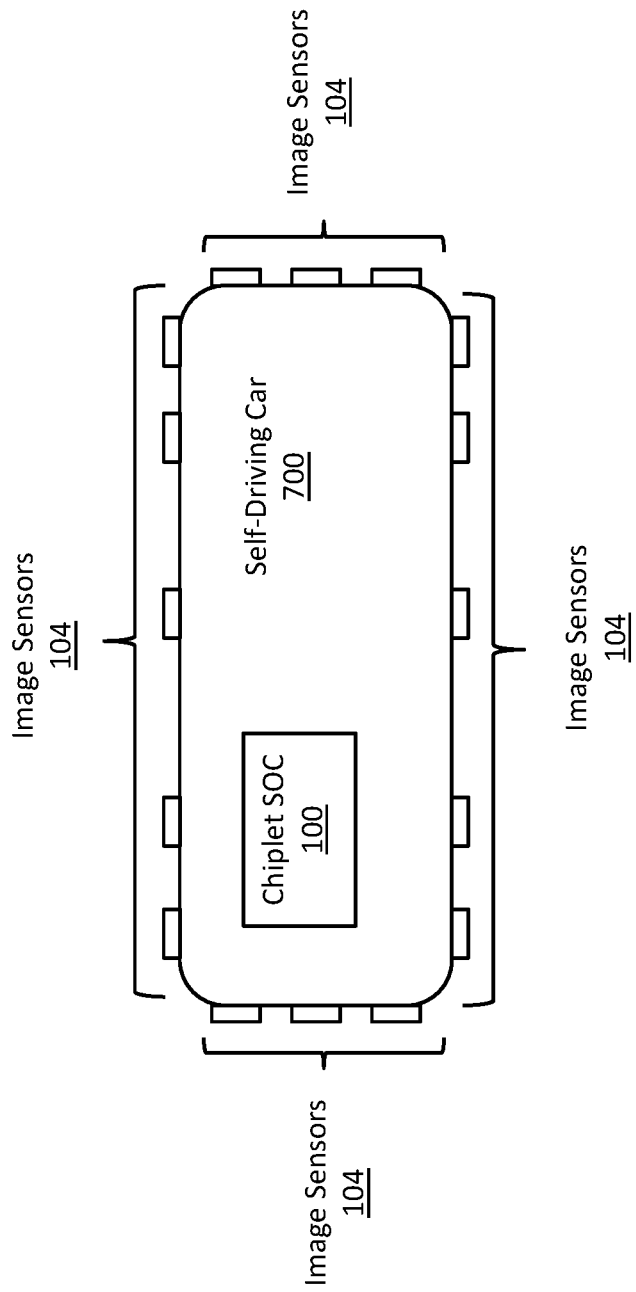
FIG. 7 depicts an embodiment of a self-driving car containing a chiplet SOC.

For example, the embodiments can be used in AI environments such as in a self-driving car. FIG. 7 depicts self-driving car 700, which comprises chiplet SOC 100 and image sensors 104 surrounding the vehicle to capture real-time images of the environment around self-driving car 700. In self-driving car, the real-time system in chiplet SOC 100 collects data from the image sensors 104 in cameras located on the car, image sensor processors in chiplet SOC 100 generate post-processed images using the collected data, neural processing units in chiplet SOC 100 perform rigorous mathematical operations on the post-processed images, and a host system in chiplet SOC 100 then controls operations of the self-driving car in response to results from the neural processing units, in accordance with the description of chiplet SOC 100 contained above and described with reference to previous Figures.

It should be noted that, as used herein, the terms "over" and "on" both inclusively include "directly on" (no intermediate materials, elements or space disposed therebetween) and "indirectly on" (intermediate materials, elements or space disposed therebetween). Likewise, the term "adjacent" includes "directly adjacent" (no intermediate materials, elements or space disposed therebetween) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements therebetween, as well as forming the element indirectly on the substrate with one or more intermediate materials/elements there between.

What is claimed is:

1. A chiplet system-on-chip comprising:
a host system executing a host operating system, the host system comprising a multi-core central processing unit (CPU), the multi-core CPU comprising a local cache memory system;
a real-time system executing a real-time operating system, the real-time system comprising a first chiplet link;
one or more chiplets, each chiplet comprising a chiplet link coupled to the first chiplet link;
one or more memory devices forming an addressable memory space, the addressable memory space comprising a cacheable memory space and a non-cacheable memory space; and
a hybrid system fabric configured to provide the host system with access to some or all of the cacheable memory space over one or more cacheable memory channels and to provide the real-time system and the one or more chiplets with access to some or all of the non-cacheable memory space over one or more non-cacheable memory channels, each cacheable memory channel comprising a snooping port to maintain cache coherency as to the local cache memory system.

2. The chiplet system-on-chip of claim 1, wherein the real-time system comprises an interface for communicating with one or more image sensors.

3. The chiplet system-on-chip of claim 2, wherein the real-time system comprises one or more image sensor processors for processing data received from the one or more image sensors.

4. The chiplet system-on-chip of claim 3, wherein the real-time system comprises one or more neural processing units for processing data received from the one or more image sensor processors.

5. The chiplet system-on-chip of claim 1, wherein the real-time system comprises one or more neural processing units.

6. The chiplet system-on-chip of claim 1, wherein the one or more chiplets comprises one or more image sensor processors.

7. The chiplet system-on-chip of claim 1, wherein the one or more chiplets comprises one or more neural processing units.

8. A method of processing image data by a chiplet system-on-chip comprising a real-time system and a host system, the method comprising:
capturing, by an image sensor, a set of image sensor data;
transmitting, by the image sensor, the set of image sensor data over a first non-cacheable memory channel to the real-time system, wherein the first non-cacheable memory channel is not accessible by the host system;
processing, by an image signal processor, the set of image sensor data to generate a post-processed image;
storing, by the image signal processor using a hybrid system fabric, the post-processed image in a non-cacheable space in a memory device;
accessing, by the host system using the hybrid system fabric over a second non-cacheable memory channel, the post-processed image from the non-cacheable space in the memory device.

9. The method of claim 8, wherein the image signal processor is located in the real-time system.

10. The method of claim 8, wherein the image signal processor is located in a chiplet.

11. The method of claim 8, further comprising storing the post-processed image in a second memory device.

12. The method of claim 11, further comprising accessing, by a neural processing unit, the post-processed image from the second memory device.

13. The method of claim 8, wherein a neural processing unit is located in the real-time system.

14. The method of claim 8, wherein a neural processing unit is located in a chiplet.

15. The method of claim 8, further comprising:
capturing, by a second image sensor, a second set of image sensor data;
transmitting, by the second image sensor, the second set of image sensor data over a second memory channel to the real-time system;
processing, by a second image signal processor, the second set of image sensor data to generate a second post-processed image;
storing the second post-processed image in the memory device; and
accessing, by the host system, the second post-processed image from the memory device.

16. The method of claim 15, wherein the second image signal processor is located in the real-time system.

17. The method of claim 15, wherein the second image signal processor is located in a chiplet.

18. The method of claim 15, further comprising storing the second post-processed image in a second memory device.

19. The method of claim 18, further comprising accessing, by a neural processing unit, the second post-processed image from the second memory device.

* * * * *